United States Patent
Wilbert et al.

(10) Patent No.: US 9,797,514 B2
(45) Date of Patent: Oct. 24, 2017

(54) BIDIRECTIONALLY TESTABLE SEAL CONFIGURATION

(71) Applicant: Schlumberger Technology Corporation, Sugar Land, TX (US)

(72) Inventors: Adrien Wilbert, Dhahran (SA); Debasmita Basak, Pearland, TX (US); Dinesh Patel, Sugar Land, TX (US); Bertrand Mancelle, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 17 days.

(21) Appl. No.: 14/915,472

(22) PCT Filed: Aug. 29, 2014

(86) PCT No.: PCT/US2014/053470
§ 371 (c)(1),
(2) Date: Feb. 29, 2016

(87) PCT Pub. No.: WO2015/031786
PCT Pub. Date: Mar. 5, 2015

(65) Prior Publication Data
US 2016/0215888 A1   Jul. 28, 2016

Related U.S. Application Data

(60) Provisional application No. 61/872,190, filed on Aug. 30, 2013.

(51) Int. Cl.
*F16J 15/32*   (2016.01)
*F16J 15/00*   (2006.01)
(Continued)

(52) U.S. Cl.
CPC ....... *F16J 15/3296* (2013.01); *E21B 47/1025* (2013.01); *F16J 15/002* (2013.01);
(Continued)

(58) Field of Classification Search
CPC .. F16J 15/00; F16J 15/002; F16J 15/06; F16J 15/064; F16J 15/32; F16J 15/3296;
(Continued)

(56) References Cited

U.S. PATENT DOCUMENTS 5,090,871 A * 2/1992 Story ................ F16L 23/167
                                                    210/85
6,435,775 B1 * 8/2002 Nish ................ E21B 17/012
                                                    114/264
(Continued)

FOREIGN PATENT DOCUMENTS

DE    EP 0654629 A1 * 5/1995 .............. F16L 21/00
WO    WO 9821508 A1 * 5/1998 .............. E21B 33/03

OTHER PUBLICATIONS

PCT/US2014/053470 International Search Report and Written Opinion dated Dec. 10, 2014, 9 pgs.

*Primary Examiner* — Nguyen Ha (57) ABSTRACT

A seal assembly made up of multiple opposite oriented unidirectional seals. The assembly includes a dedicated test port for each of the unidirectional seals. Thus, a first test port may be directed at the first seal such that if the first seal leaks, the second seal is configured to collapse and allow a second test port coupled thereto to detect the leak of the first seal. By the same token, the first test port may be used to detect any leak in the second seal which is detectable as the first seal collapses as a result of the leak. This unique type of architecture allows for a reliable manner of testing a multiple seal assembly that may be prone to leaks from multiple directions, for example from either a bore or an annular side of a tubular. This renders the bidirectionally
(Continued)

testable seal configuration beneficial for incorporation into downhole completions hardware such at the location of a test gauge secured to a carrier device.

20 Claims, 5 Drawing Sheets

(51) Int. Cl.
*F16J 15/06* (2006.01)
*E21B 47/117* (2012.01)
*F16J 15/3296* (2016.01)
*F16J 15/08* (2006.01)
*E21B 47/10* (2012.01)
*G01M 3/28* (2006.01)

(52) U.S. Cl.
CPC ......... *F16J 15/064* (2013.01); *F16J 15/0887* (2013.01); *G01M 3/2853* (2013.01)

(58) Field of Classification Search
CPC .... E21B 47/10; E21B 47/1025; E21B 47/117; G01M 3/28; G01M 3/2853
See application file for complete search history.

(56) References Cited

U.S. PATENT DOCUMENTS

| | | | |
|---|---|---|---|
| 6,502,833 B1 * | 1/2003 | Shibata | F16J 15/0887 |
| | | | 277/647 |
| 6,763,701 B1 * | 7/2004 | Moretz | F16L 37/252 |
| | | | 285/362 |
| 7,055,390 B2 * | 6/2006 | Foote | G01M 3/2853 |
| | | | 277/355 |

* cited by examiner

BIDIRECTIONALLY TESTABLE SEAL CONFIGURATION

PRIORITY CLAIM/CROSS REFERENCE TO RELATED APPLICATION(S)

This patent Document is a Continuation-In-Part claiming priority under 35 U.S.C. §119 to U.S. Provisional App. Ser. No. 61/872,190 entitled "Independently Pressure Testable Dual Hybrid Bidirectional Seal Design", filed on Aug. 30, 2013, and which is incorporated herein by reference in its entirety.

BACKGROUND

Exploring, drilling and completing hydrocarbon and other wells are generally complicated, time consuming and ultimately very expensive endeavors. In recognition of these expenses, added emphasis has been placed on efficiencies associated with well completions and maintenance over the life of the well. Over the years, ever increasing well depths and sophisticated architecture have made reductions in time and effort spent in completions and maintenance operations of even greater focus. Similarly, added focus is also placed on well testing and functionality from the outset of completions and into early well operations, for example, to ensure reliable well control is has been achieved.

In terms of architecture, the terminal end of a cased well often extends into an open-hole section. Thus, completions hardware will generally include lower completions installation at this section. This may include installation of an assembly that includes screen equipment, a gravel packer, frac sleeve and other features. A well control valve may also be installed in conjunction with or immediately after the lower completion. This will be followed by installation of upper completions hardware. The upper completions hardware may include production tubing or hardware supporting zonal isolation that is located above the open-hole section as well as other features such as chemical injection or power and communication lines. Regardless, once the completions hardware is fully installed, testing may take place to ensure reliable well control is has been achieved. For example, the architecture may be configured with the production tubing being isolated within an annulus of the casing and providing a controlled fluid conduit to the control valve, lower completion and surrounding formation. Thus, pressure testing the interior of the production tubing as well as the annulus may be desirable before the production tubing is relied upon for production operations. This way, a controlled uptake of hydrocarbons from the well and through the production tubing may be better assured.

Certain locations of the completions architecture may be more prone than others to develop leaks. For example, isolating packers or the control valve governing access to the lower completions are generally more reliable in maintaining well control than locations where a testing gauge has been incorporated into tubular hardware. That is, for sake of testing and monitoring pressure, temperature, flow and other well characteristics, a test gauge may be incorporated into production tubing of the completions hardware. More specifically, the test gauge may be located at a tubular gauge carrier of limited length that is itself incorporated into production tubing. In this way, an operator may manually assemble the gauge and carrier device at the oilfield surface or platform. Then, much longer production tubing sections may be coupled to each end of the carrier and deployed in conjunction with upper completions as described above.

While such a test gauge may be adept at simultaneously providing a host of readings, both from within the production tubular as well as from the surrounding isolated annulus, as noted above, it may also more susceptible to develop a leak. For example, the gauge is generally an intricate electronic and handheld package, small enough to be manually secured at a location that is otherwise open to both annular and bore sides of the carrier. Indeed, unlike an inflatable packer or other high pressure sealing device, whether or not a downhole leak develops at the location of the gauge is often ultimately a matter of how well the operator positions and tightens the gauge in place at the carrier. That is, unlike a mechanical or inflatable packer, no follow-on downhole actuation is available to ensure a maximum seal is achieved between the gauge and carrier.

Regardless of whether a leak occurs at a gauge location as described above or elsewhere, the consequences of lost well control which results are quite significant. For example, even if a leak is detected during initial testing, there is generally a need for removing at least upper completions hardware and performing a workover. In the case of land-based oilfield operations this may run upwards of 10 million dollars, not counting lost production time. At the other end of the spectrum, a loss of well control during subsea operations may approach 20 million dollars or more in workover expenses.

Given the potential expenses involved and the increased susceptibility to leakage faced by the gauge and gauge carrier device, surface testing of the assembled device generally takes place before the device is deployed into the well with the production tubing. For example, the gauge itself may be rated to withstand 10,000 PSI with a 10-15 year lifespan, depending on well conditions and operations. Of course this still requires a proper seal be attained during manual assembly of the device.

In addition to surface testing of the assembled gauge carrier, efforts have been undertaken to further ensure adequate sealing between the gauge and the carrier. For example, given that the interface of the gauge and carrier is susceptible to leakage emerging from both the inner bore side of the tubular carrier as well as the external annular side, multiple seals may be placed at the interface. However, this results in the unique circumstance of being unable to independently check the multiple seals on a one by one basis. That is, while use of more than one seal may theoretically reduce the likelihood of leakage, if only one of the seals is faulty, there is no conventional way to diagnose the issue. This is because, during surface testing, the remaining non-faulty seal(s) prevent the leak from being perceptible. In such circumstances, the advantage of utilizing an added seal is now lost without the operator being provided any advance warning prior to deployment of the gauge carrier into the well.

SUMMARY

A seal assembly for a tubular mechanism. The assembly includes multiple test port devices and unidirectional seals. More specifically, a first test port device is pressurizably coupled to a first unidirectional seal at a bore side of the mechanism. At the same time, a second test port device is pressurizably coupled to a second unidirectional seal at an annular side of the mechanism. Further, the first test port device may be configured to detect failure of the second unidirectional seal and the second test port device is configured to detect failure of the first unidirectional seal.

DETAILED DESCRIPTION

Embodiments are described with reference to certain downhole hardware and architecture. Specifically, the embodiments depict a gauge carrier incorporated into production tubing of completions hardware. However, any number of different types of downhole devices utilizing multiple seals that might benefit from testing at either side thereof may benefit from the configurations and techniques detailed herein. For example, even in the case of a gauge directed at testing both bore and annular locations relative a tubular, the gauge may be associated with production tubing, well casing, a frac-sleeve or any other number of completions tubulars. So long as multiple unidirectional seals are utilized with multiple test ports according to unique architectural embodiments as detailed herein, appreciable benefit may be realized.

Figure 1:
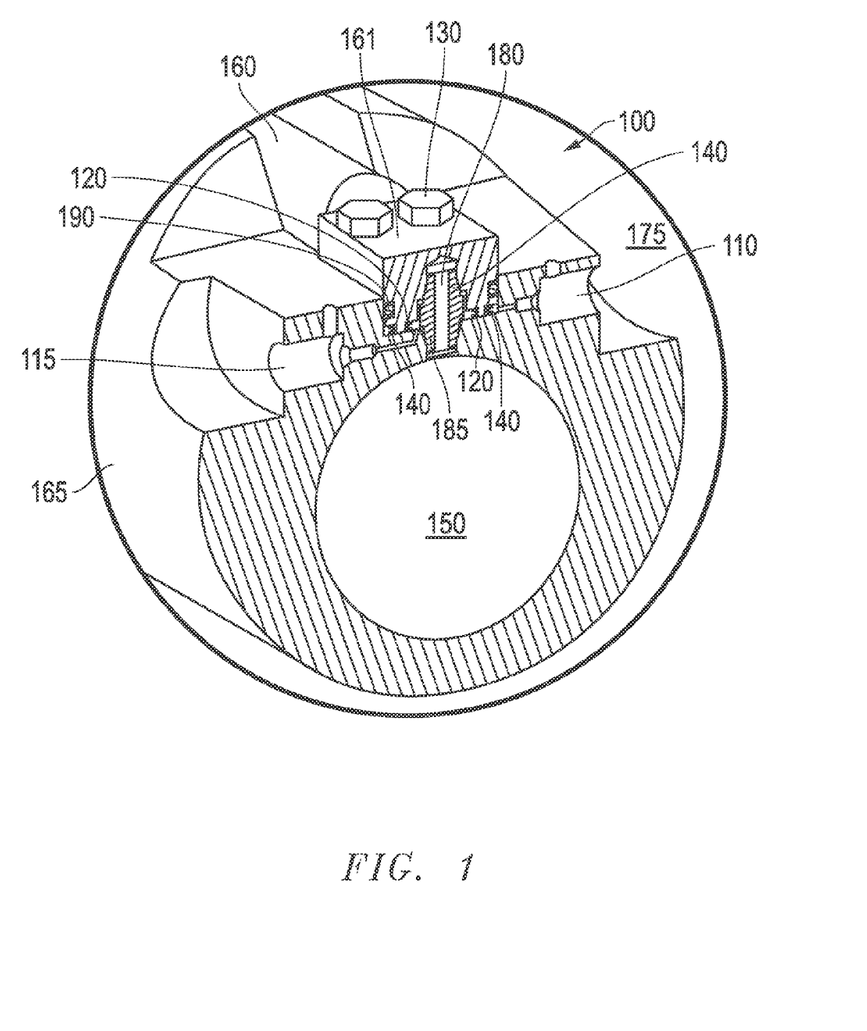
FIG. 1 is a perspective cross-sectional view of an embodiment of a carrier device utilizing a seal assembly that is testable from both annular and bore sides of a tubular mechanism that accommodates the assembly.

Referring now to FIG. 1, a perspective cross-sectional view of an embodiment of a carrier device 100 is shown. The device 100 includes a tubular mechanism 165 that accommodates a test gauge 160 which is configured to obtain readings from both a bore side 150 and an annular side 175 of the device 100. Thus, a seal assembly is provided at the interface of the gauge 160 and tubular mechanism 165. Specifically, the gauge 160 is mounted to the mechanism 165 in a way that leaves it exposed to the annular side 175 of the device 100 while a ferrule seal body 185 is provided to define a channel 180 from the bore side 150 of the device 100 to the gauge 160. As such, this one gauge 160 is well positioned to obtain temperature, pressure and other readings from both sides 150, 175 of the device 100 at the same time.

Exposure by the gauge 160 to both sides 150, 175 of the device 100 means that added measures may be taken to ensure that proper sealing is assured between the gauge 160 and the tubular mechanism 165 (and about the ferrule seal body 185 in the embodiment shown). Otherwise, the simultaneous access to both sides 150, 175 of the device 100 may risk a loss of well control. That is, these added measures are to ensure sufficient sealing at the location of the gauge 160. For example, tightening bolts 130 or any other manually adjustable compression device at the head 161 of the gauge 160 to tighten may enhance sealing (and forcibly wedge the ferrule seal body 185 in place). Further, a conventional O-ring 190 may be provided at the interface of the gauge 160 and the tubular mechanism 165. Even more notably though, embodiments herein also include the use of both an inner bore seal 120 and an outer annular seal 140. As detailed below, these seals 120, 140 are each uniquely oriented and configured to behave in a unidirectional manner and to allow testing thereof prior to utilizing the assembled carrier device 100. As a result, an operator assembling the carrier device 100 at an oilfield surface may be afforded the ability to independently test each seal 120, 140 to separately ensure both bore 150 and annular 175 sealing prior to exposing the carrier device 100 to the environment of a high pressure well.

Continuing with reference to FIG. 1, a unidirectional bore seal 120 is located at the interface of the ferrule seal body 185 and the gauge 160 immediately adjacent the underlying structure of the tubular mechanism 165. In other embodiments the bore seal 120 may be positioned or oriented somewhat differently. Regardless, as depicted in FIG. 1, the seal 120 is utilized to seal off the interface from the bore 150 of the tubular mechanism 165. Specifically, in the embodiment shown, the bore seal 120 is a unidirectional c-ring that is fluidly coupled to a bore test port 115 at its seal side. The bore test port 115 is oriented to interface the bore seal 120 from a location that is consistent with the direction/location of the bore 150 itself. Thus, the sealingly responsive behavior by the bore seal 120 in response to pressure from the bore test port 115 mimics the sealing behavior that would take place in response to actual bore pressures. On the other hand, pressure directed at the bore seal 120 from the opposite side will result in collapse of the seal 120. This is what is meant by a unidirectional sealing behavior of the seal 120 and is an intentional feature thereof. Of course, given that multiple seals 120, 140 of opposite orientation are ultimately utilized as described further below, the overall seal assembly may be referred to as bidirectional when the behavior of both seals 120, 140 is considered in combination.

As described above, the bore seal 120 is directed at sealing off pressure from the bore 150 and/or bore test port 115. In this way, the bore test port 115 may also double as a testing device for the sealability of the annular seal 140. That is, when the bore seal 120 is not being tested, the bore test port 115 may be equipped to detect fluid pressure that originates from the other side of the bore seal 120. For example, when pressure testing of the annular seal 140 takes place, it is initiated by the annular test port 110. In circumstances where the annular seal 140 leaks and allows fluid pressure to reach the bore seal 120, the unidirectional nature of the bore seal 120 is such that it will collapse and allow the fluid pressure to reach and be detected by the bore test port 115.

Of course, these same principles may be applied in testing the bore seal 120 itself. That is, in the embodiment shown, and as alluded to above, the annular seal 140 is also of a c-ring configuration. Thus, the behavior of the annular seal 140 is similar to that of the bore seal 120, the exception being that the annular seal 140 is directed at sealing off pressure from the annular side 175 and/or annular test port 110. Therefore, the annular test port 110 may also double as a testing device, in this case, for the sealability of the bore seal 120. For example, when pressure testing is initiated by the bore test port 115, failure of the bore seal 120 may result in a leak that is ultimately detected at the annular test port 110 (i.e. due to the allowed intentional collapse of the annular seal 140 as a result of sufficient pressure from the bore side thereof).

The above described architecture is one of oppositely oriented unidirectional seals 120, 140 in combination with each being assigned a dedicated test port 110, 115 that also serves as a location for detecting leaks from the non-assigned seal 120, 140. As a practical matter, this means that an operator at an oilfield surface may independently test multiple seals 120, 140 at an interface of a test gauge 160 and a tubular mechanism 165 in a user friendly and reliable manner. That is, once assembled, the operator may plug a pressure inducing device into one of the test ports (e.g. 110) and a detector into the other (e.g. 115), pressure up to a predetermined level and confirm the reliability of one seal (e.g. 140). For example, a pressure test fluid may be utilized and a pressure of up to about 10,000 PSI applied in circumstances where the seal 140 is rated to such a pressure.

Then the same process may be repeated to confirm the reliability of the other seal (e.g. 120), with the test ports 110, 115 exchanging pressure inducing and detector functions with one another. Ultimately, the operator is provided with a dual seal device at a tubular location that is exposed to both bore 150 and annular 175 pressures and yet each seal may be reliably and independently tested in a user friendly manner before the device is ever placed in a high pressure well environment.

Figure 2A:
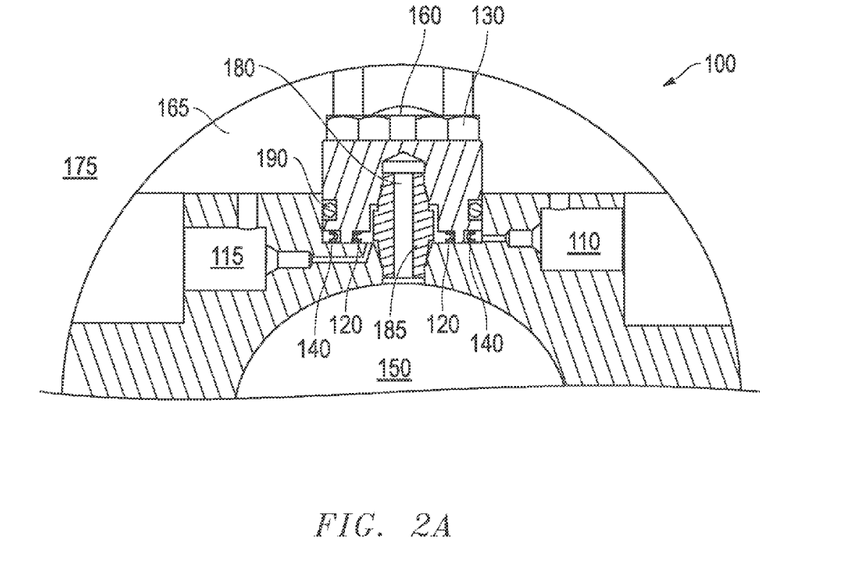
FIG. 2A is a side cross-sectional view of the seal assembly and tubular mechanism of FIG. 1 highlighting dual unidirectional seals of the assembly at an interface of a test gauge and tubular structure of the carrier device.

Referring now to FIG. 2A, a side cross-sectional view of the seal assembly and tubular mechanism 165 of FIG. 1 are shown as part of the assembled carrier device 100. In this view, the unidirectional seals 120, 140 are highlighted along with the overall interfacing of the test gauge 160 and the structure of the tubular mechanism 165. The interfacing of each test port 110, 115 and corresponding seal 120, 140 is also clearly apparent. These test ports 110, 115 may be considered autoclave test ports configured to operate at sufficiently high pressures and temperatures to mimic the potential downhole environment for the carrier device 100.

The ferrule seal body 185 is also highlighted in the view of FIG. 2A. Irrespective of additional seals 120, 140 and 190 at the interface of the gauge 160 and tubular mechanism 165, the ferrule seal body 185 may serve as a hydraulic gland, bidirectionally sealing against both internal bore 150 and external annular 175 pressures. Further, in the embodiment shown, another single bidirectional seal in the form of an o-ring 190 is also located at the interface of the gauge 160 and tubular mechanism 165. This o-ring 190 may be of a conventional fluoroelastomer or other suitable elastomer type for the downhole environment.

As to the unidirectional seals 120, 140, they are oriented with the annular seal 140 being the outermost seal and the bore seal 120 being the innermost seal. This is due to the potential leak paths at hand. That is, the interfacing of ferrule seal body 185 with the tubular mechanism 165 provides a potential leak path from the bore 150 which is interior of any potential leak path from surrounding annular 175 areas. Thus, the unidirectional seals 120, 140 are oriented with this in mind.

Figure 2B:
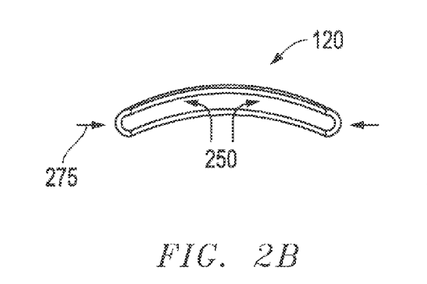
FIG. 2B is a perspective cross-sectional view of a unidirectional inner bore seal of the seal assembly of FIG. 2A.
Figure 2C:
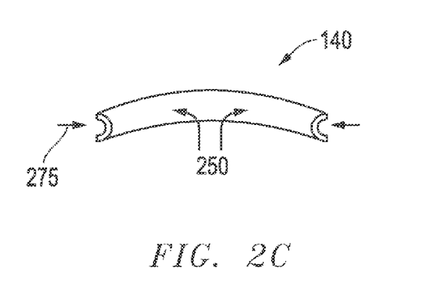
FIG. 2C is a perspective cross-sectional view of a unidirectional outer annular seal of the seal assembly of FIG. 2A.

Referring now to FIGS. 2B and 2C, perspective cross-sectional views of these unidirectional seals 120, 140 of FIG. 2A are shown. Specifically, FIG. 2B is a view of the inner bore seal 120 whereas FIG. 2C is a view of the outer annular seal 140. As indicated above, the seals 120, 140 are of c-ring configurations that are oppositely oriented one another. Specifically, the inner bore seal 120 is configured to hold in the face of bore fluid pressure (arrows 250). By the same token, however, the bore seal 120 is configured to intentionally collapse in the face of annular fluid pressure (arrows 275). Thus, as detailed above, testing of the annular seal 140 may take place. Similarly, the outer annular seal 140 is configured to hold in the face of annular fluid pressure (arrows 275) but to collapse in the face of bore fluid pressure (arrows 250). In this manner, testing of the bore seal 120 may take place as detailed hereinabove.

The unidirectional seals 120, 140 may be of a c-ring configuration as described above. However, other types of seal architecture may be utilized which allow for the seals 120, 140 to hold pressure in one direction while intentionally allowing for collapse in the face of pressure from the opposite direction. Additionally, the seals 120, 140 may be both liquid and gas tight, metallic, and employ other suitable characteristics for a downhole environment.

Figure 3A:
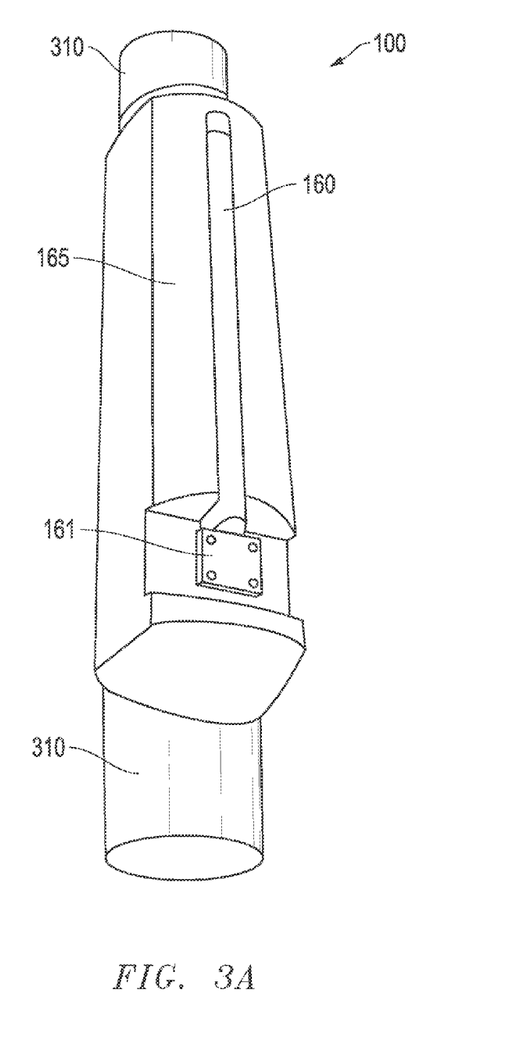
FIG. 3A is a perspective view of the carrier device of FIG. 1 with incorporated test gauge.
Figure 3B:
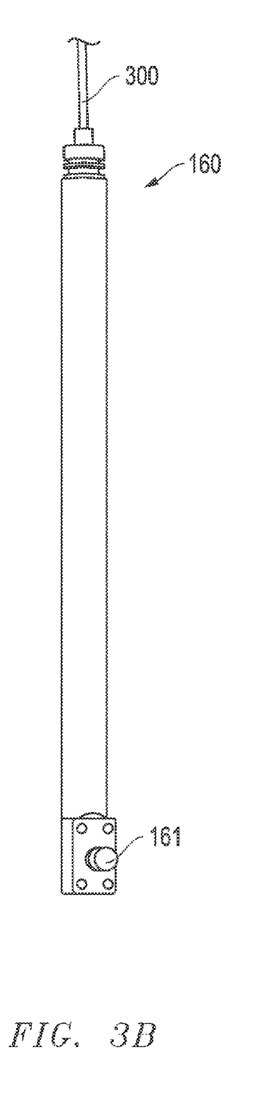
FIG. 3B is a perspective view of the test gauge of FIG. 3A.

Referring now to FIGS. 3A and 3B, perspective views of the carrier device 100 and the test gauge 160 of FIG. 1 are shown. Specifically, FIG. 3A is a depiction of the fully assembled carrier device 100 with the test gauge 160 secured thereto for downhole use. FIG. 3B, depicts the test gauge 160 alone prior to incorporation into the tubular mechanism 165 of the carrier device 100.

The views of FIGS. 3A and 3B reveal how these components might appear as they would to an operator in the field, for example, at an oilfield surface or platform. That is, as with a conventional assembly, the operator may be provided with a tubular mechanism 165 to which a test gauge 160 may be manually secured. In the embodiments shown here, the various parts may be aligned and assembled, bolts 130 at the head 161 of the gauge 160 may be tightened and the seals 120, 140 pressure tested as detailed hereinabove (see FIGS. 2A-2C).

Once seal testing is completed as described above, ends 310 of the carrier device 100 may be secured to production tubing and a gauge line 300 to surface equipment provided. In one embodiment, this line 300 is a conventional downhole electric cable serving any and all power and/or telemetry requirements for the gauge 160. Regardless, the carrier device 100 is now ready for installation and use with other downhole completions hardware.

Figure 4:
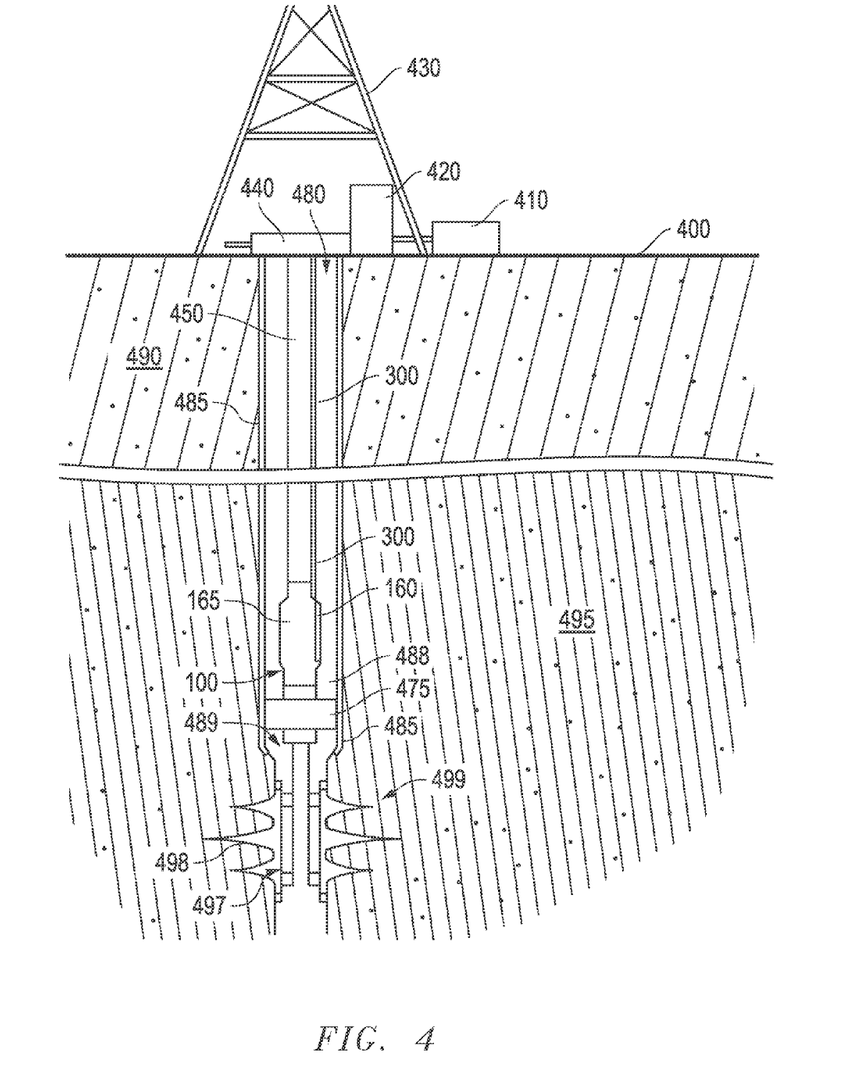
FIG. 4 is an overview of an oilfield with a well accommodating completions hardware that utilizes the carrier device with test gauge of FIG. 3A to provide well information to surface equipment.

Referring now to FIG. 4, an overview of an oilfield 400 is shown with a well 480 accommodating completions hardware that utilizes the carrier device 100 and test gauge 160 of FIGS. 3A and 3B described above. As indicated, the gauge 160 may provide well information such as pressure, temperature, flow and other readings over a line 300 to surface equipment. Specifically, in the embodiment shown, a control unit 420 is shown at the oilfield 400 which may keep track of well readings obtained from the test gauge 160. In the embodiment shown, other surface equipment such as a pump 410, supportive rig 430 and well head 440 are depicted. Of course, a host of additional or different types of equipment may also be present at the oilfield 400 in support of well operations.

The unique sealing character of the carrier device 100 as detailed hereinabove may be beneficial in well operations such as those depicted in FIG. 4. For example, in the embodiment shown, the well 480 is defined by casing 485 traversing multiple formation layers 490, 495 before reaching lower completions hardware 497 and perforations 498 at a production region 499. Thus, the depth of the well 480 may exceed several thousand feet to reach hydrocarbons at the region 499 and may expose the carrier device 100 to excessively high pressures and/or temperatures. Nevertheless, the operator's ability to test sealability of the assembled tubular mechanism 165 and gauge 160 into a carrier device 100, provides a degree of assurance that well control may be maintained. That is, in spite of potentially large disparity in pressure between the bore of the carrier or production tubing 450 and surrounding annular locations 488, 489, operations may proceed without undue concern over leakage through the interface of the gauge 160 and tubular mechanism 165. In fact, this may be of particular benefit where, as in the depicted embodiment, the carrier device 100 is located so far downhole that it is adjacent an isolation device such as a packer 475 and a second annular location 489 likely to be of even greater pressures.

Figure 5:
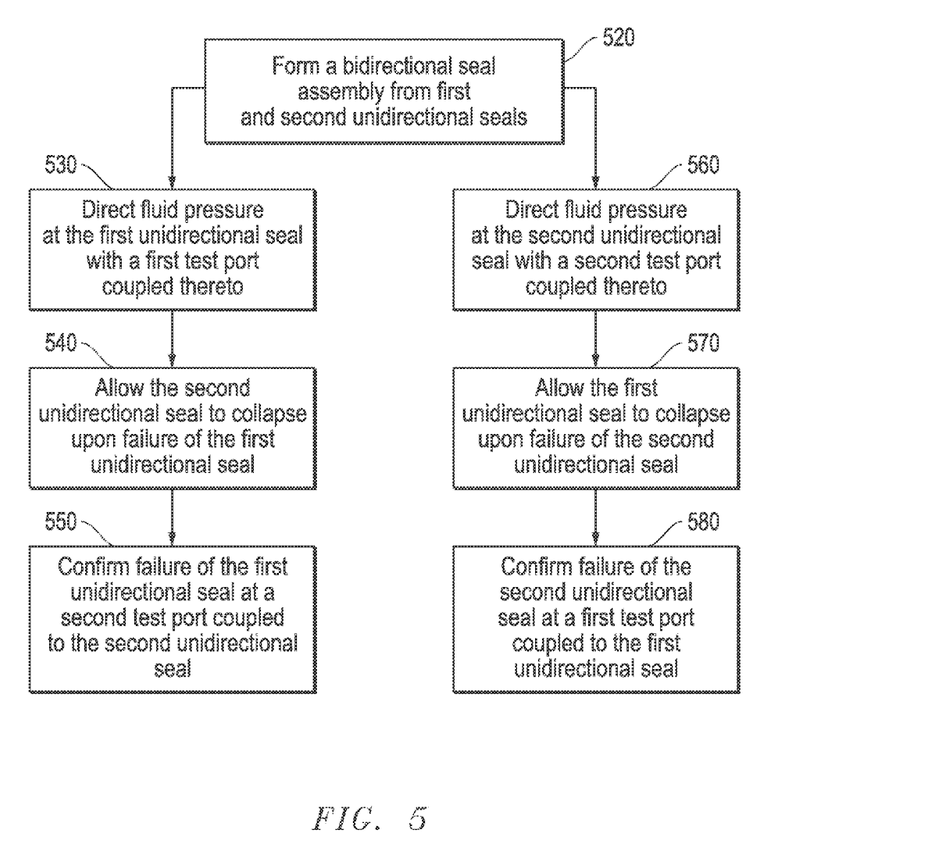
FIG. 5 is a flow-chart summarizing an embodiment of testing a dual seal assembly in a manner that assures reliability from both annular and bore sides.

Referring now to FIG. 5, a flow-chart summarizing an embodiment of assembling and testing a bidirectional seal assembly from separate unidirectional seals is shown. As indicated at 520, the noted separate unidirectional seals may be assembled, for example, manually by an operator at an oilfield. Due to the architecture of the assembly including the seals and test ports coupled thereto, each seal may be independently tested with the help of the other. Specifically, as indicated at 530-550, fluid pressure may be directed at a first unidirectional seal with a first test port coupled thereto. In turn, the second unidirectional seal may collapse in circumstances where the first unidirectional seal fails, the failure being detected at the second test port which is coupled to the second unidirectional seal. By the same token, as indicated at 560-580, fluid pressure may be directed at the second unidirectional seal with the second test port which is coupled thereto. Again, in turn, the first unidirectional seal may collapse if the second unidirectional seal exhibits failure, the failure in this case being detected at the first test port that is coupled to the first unidirectional seal. Of course, where pressure corresponding to seal ratings does not result in detectable seal failure, the operator has been able to independently verify that each of the unidirectional seals is now fit for the use at which it is rated (e.g. in the downhole environment).

Embodiments described hereinabove include use of dual seal assemblies at an interface of a downhole tubular that allows for bidirectional testing. That is, in order to ensure well control is not lost at such a location, a seal assembly is employed that utilizes seals independently directed at maintaining bore-side and annular-side sealing of the tubular. This is done with unique configurations and techniques that allow not only for independent sealing by the multiple seals but also allows for independent testing of each seal on a one by one basis. Thus, an operator may be assured that a proper seal is formed prior to deployment of the assembly into a well, for example, as part of a carrier and test gauge device of completions hardware. Ultimately this means that the odds of losing well control at such a seal location in a high pressure well are substantially reduced.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, while the benefits of utilizing embodiments of unidirectional seals together as part of a bidirectional seal assembly are detailed herein with reference to test gauges for completions hardware, other embodiments may be utilized in other applications even outside of well or oilfield environments. Furthermore, the foregoing description should not be read as pertaining only to the precise structures described and shown in the accompanying drawings, but rather should be read as consistent with and as support for the following claims, which are to have their fullest and fairest scope.

We claim:

1. A tubular carrier device for disposal in a well at an oilfield, the carrier device comprising:
   a tubular mechanism with a bore side at an interior thereof and an annular side to an exterior thereof;
   a test gauge for acquiring information from both the bore side and the annular side of the tubular mechanism; and
   a seal assembly at an interface between the test gauge and the tubular mechanism, the assembly having a bore side test port device pressurizably coupled to a first unidirectional seal and annular side test port device pressurizably coupled to a second unidirectional seal, the bore side test port device configured to detect failure of the second unidirectional seal and the annular side test port device configured to detect failure of the first unidirectional seal.

2. The tubular carrier device of claim 1 wherein the unidirectional seals are oppositely oriented c-rings.

3. The tubular carrier device of claim 1 wherein the seal assembly further comprises one of a bidirectional hydraulic gland and an elastomeric o-ring.

4. The tubular carrier device of claim 3 wherein the hydraulic gland is a ferrule seal body with a channel therethrough for accessing the bore side of the tubular mechanism.

5. The tubular carrier device of claim 1 further comprising a manually adjustable compression device for tightening the sealable interface.

6. The tubular carrier device of claim 1 wherein the information is one of downhole temperature information, pressure information and fluid flow information.

7. The tubular carrier device of claim 1 wherein the tubular mechanism is configured for coupling to production tubing for transport of hydrocarbon fluids to a surface at the oilfield.

8. The tubular carrier device of claim 7 wherein the production tubing is incorporated into completions hardware, the completions hardware further comprising lower completions hardware for the uptake of the hydrocarbon fluid from a formation defining the well and an isolation device thereabove for providing fluid isolation thereto, the lower completions hardware coupled to the production tubing for the transport of the fluids to the surface.

9. The tubular carrier device of claim 8 wherein the device is located adjacently above the isolation device.

10. A seal assembly for a tubular mechanism, the assembly comprising:
    a first test port device pressurizably coupled to a first unidirectional seal at a bore side of the mechanism; and
    a second test port device pressurizably coupled to a second unidirectional seal at an annular side of the mechanism, the first test port device configured to detect failure of the second unidirectional seal and the second test port device configured to detect failure of the first unidirectional seal.

11. The seal assembly of claim 10 wherein the first unidirectional seal is an inner bore seal and the second unidirectional seal is an outer annular seal adjacently disposed exterior of the bore seal.

12. The seal assembly of claim 10 wherein the seals are oppositely oriented c-rings.

13. The seal assembly of claim 12 wherein the seals are of metallic composition.

14. A method of testing a bidirectional seal assembly to confirm sealability of a bore seal and an annular seal thereof, the method comprising:
- directing fluid pressure at the bore seal with a bore test port fluidly coupled thereto;
- allowing the annular seal to collapse in the event of a leak in the bore seal in response to the fluid pressure directed thereat;
- detecting the leak of the bore seal at an annular test port fluidly coupled to the collapsed annular seal in the event of the leak of the bore seal;
- directing fluid pressure at the annular seal with an annular test port fluidly coupled thereto;
- allowing the bore seal to collapse in the event of a leak in the annular seal in response to the fluid pressure directed thereat; and
- detecting the leak of the annular seal at the bore test port coupled to the collapsed bore seal in the event of the leak of the annular seal.

15. The method of claim 14 wherein the seals are oppositely oriented c-rings.

16. The method of claim 14 wherein the seal assembly is at an interface of a test gauge and a tubular mechanism of a gauge carrier device, the method further comprising manually tightening a compression device at the test gauge while located at a surface of an oilfield prior to the directing of fluid pressures at the seals.

17. The method of claim 16 further comprising:
- securing the tubular mechanism of the gauge carrier device to a completions tubular; and
- deploying the completions tubular into a well at the oilfield with the gauge carrier device secured thereto.

18. The method of claim 17 further comprising using the test gauge of the gauge carrier device to acquire information relative one of flow, pressure and temperature from bore and annular regions adjacent the gauge carrier device.

19. The method of claim 18 further comprising relaying the information over a line coupled to the test gauge and to equipment located at the oilfield surface.

20. The method of claim 19 further comprising producing hydrocarbons through the gauge carrier device during the acquiring and relaying of the information.

* * * * *